Figure 7:
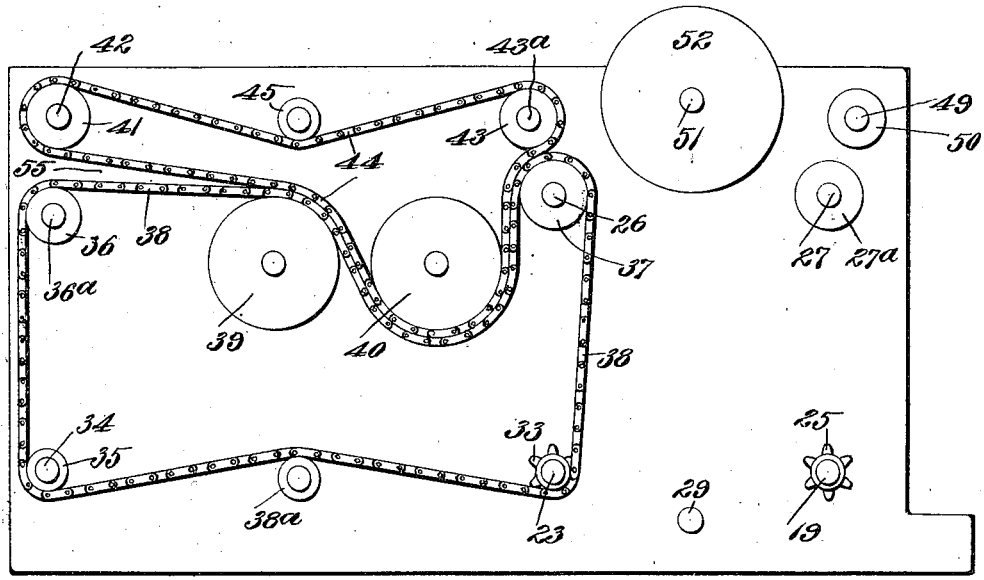

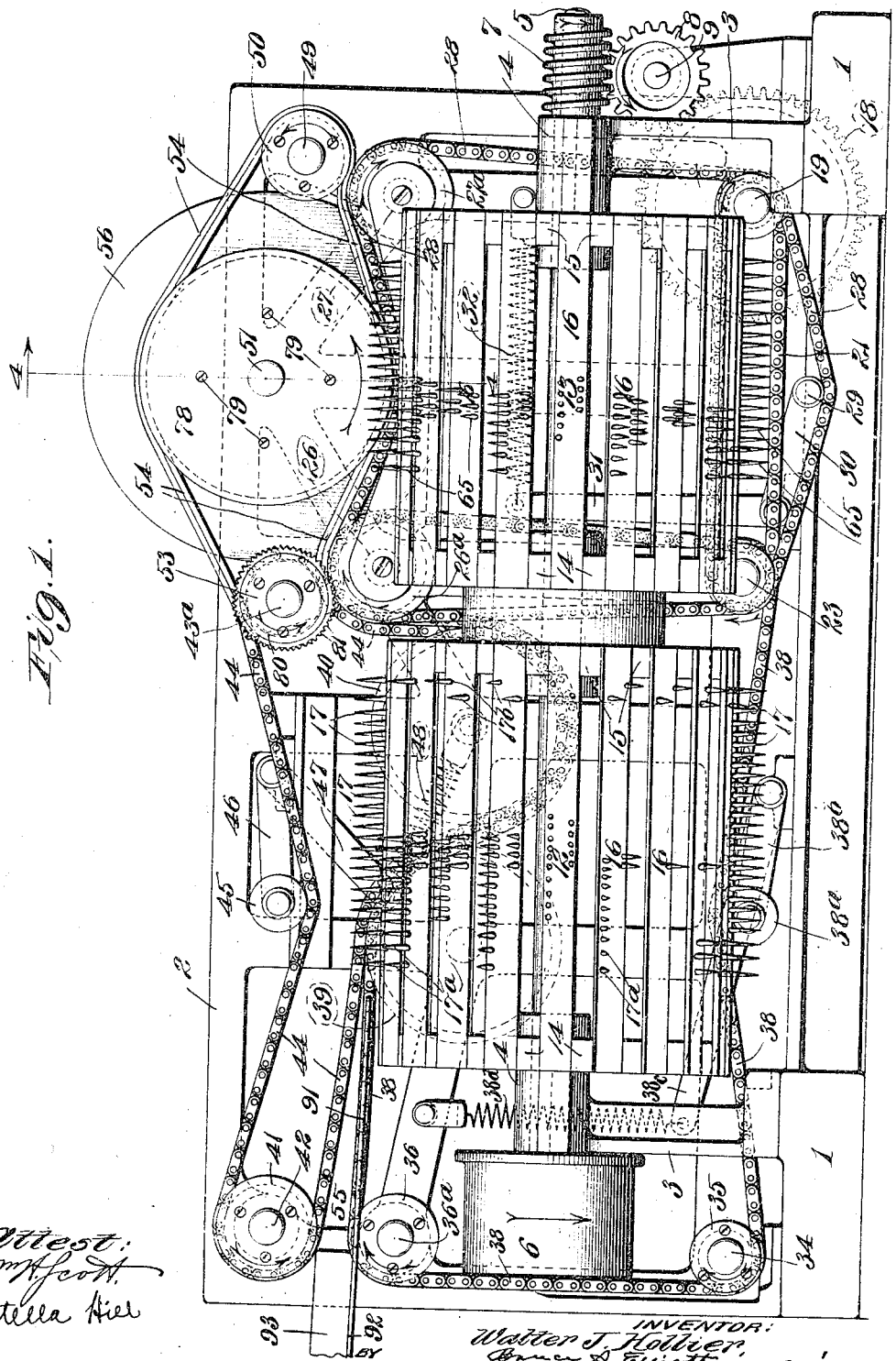

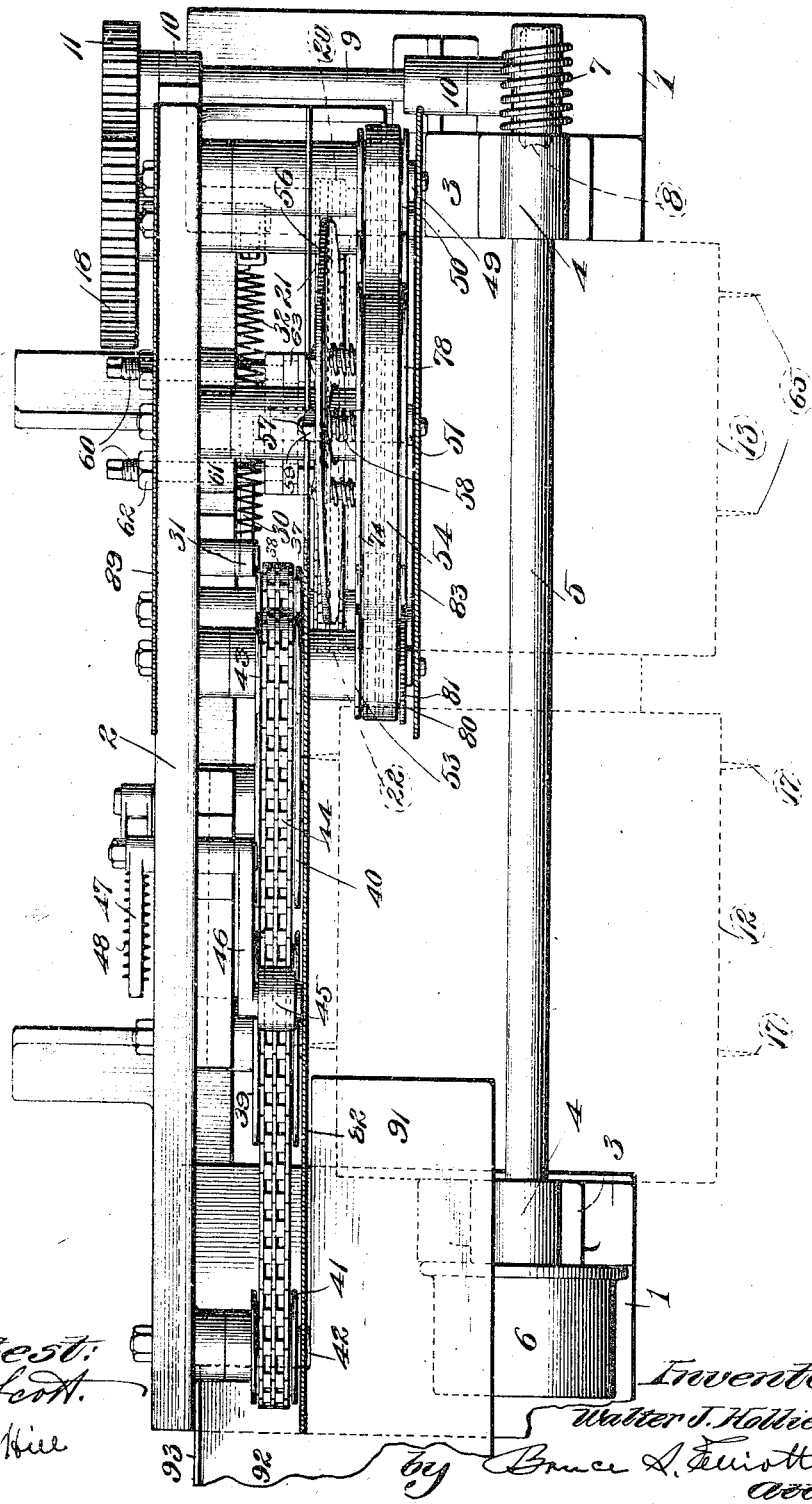

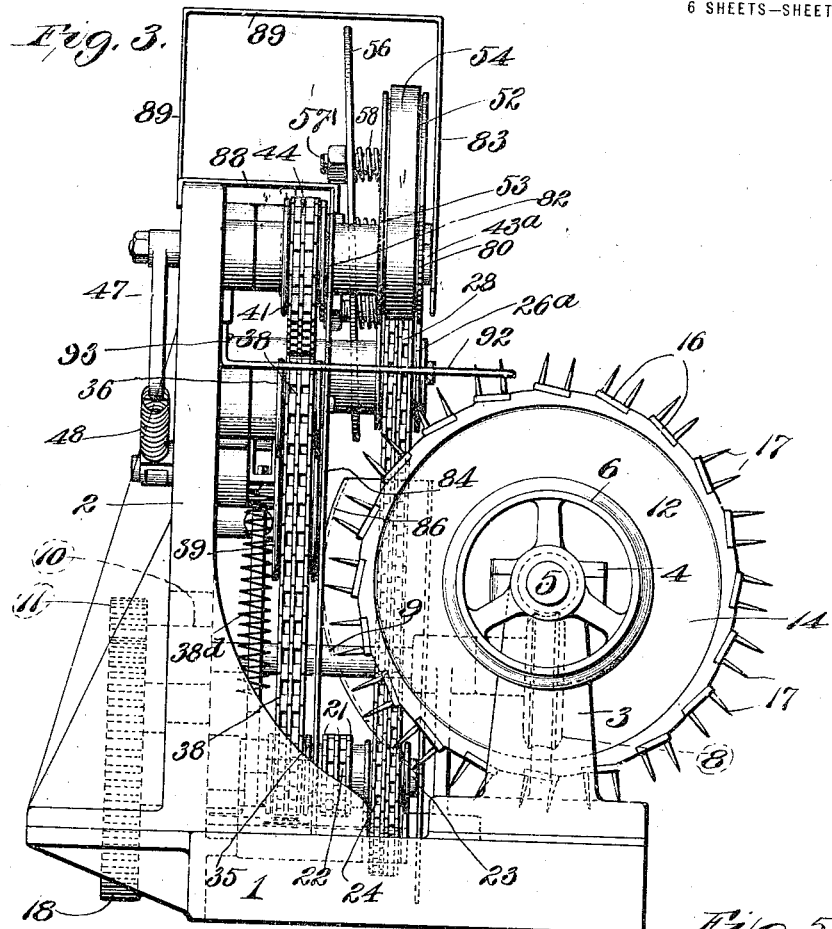
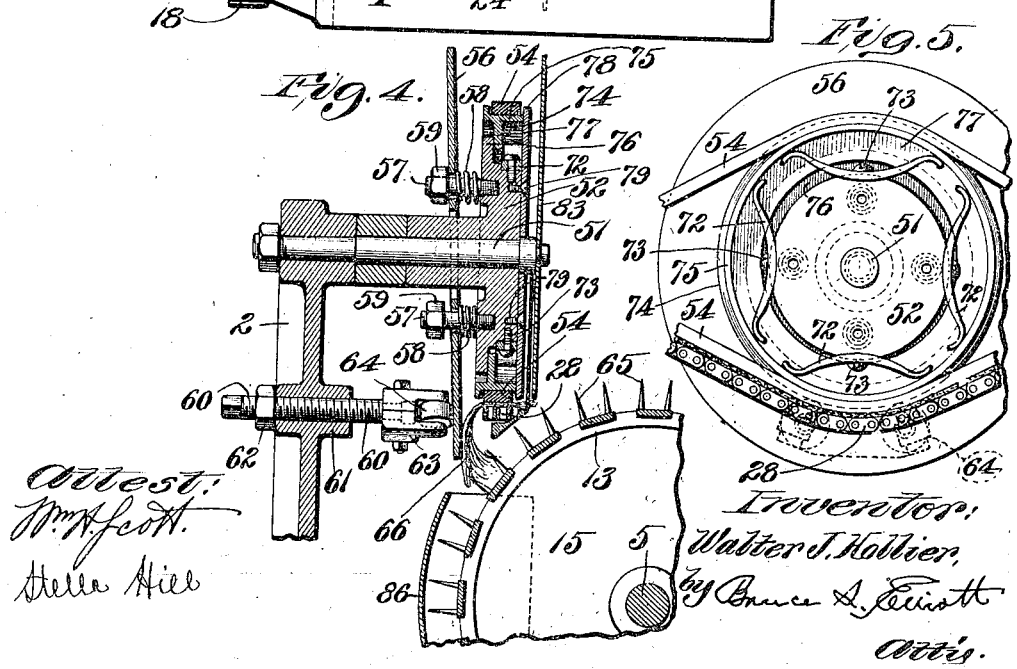

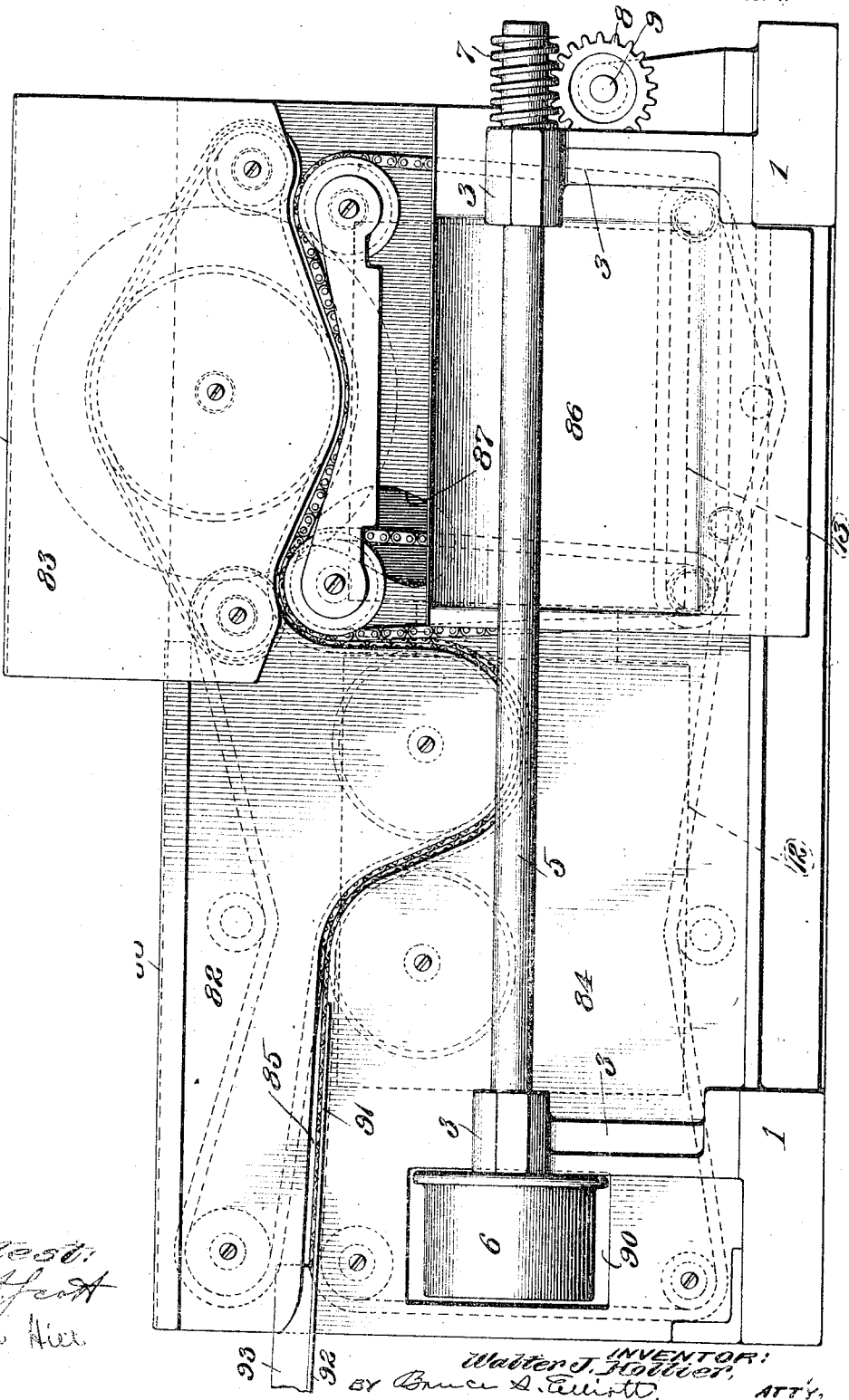

W. J. HOLLIER.
MACHINE FOR DECORTICATING FIBROUS PLANTS.
APPLICATION FILED MAY 19, 1913.

1,155,730.

Patented Oct. 5, 1915.
6 SHEETS—SHEET 5.

Attest:
Wm. H. Scott.
Stella Hill.

Inventor:
Walter J. Hollier,
by Bruce A. Elliott,
Atty.

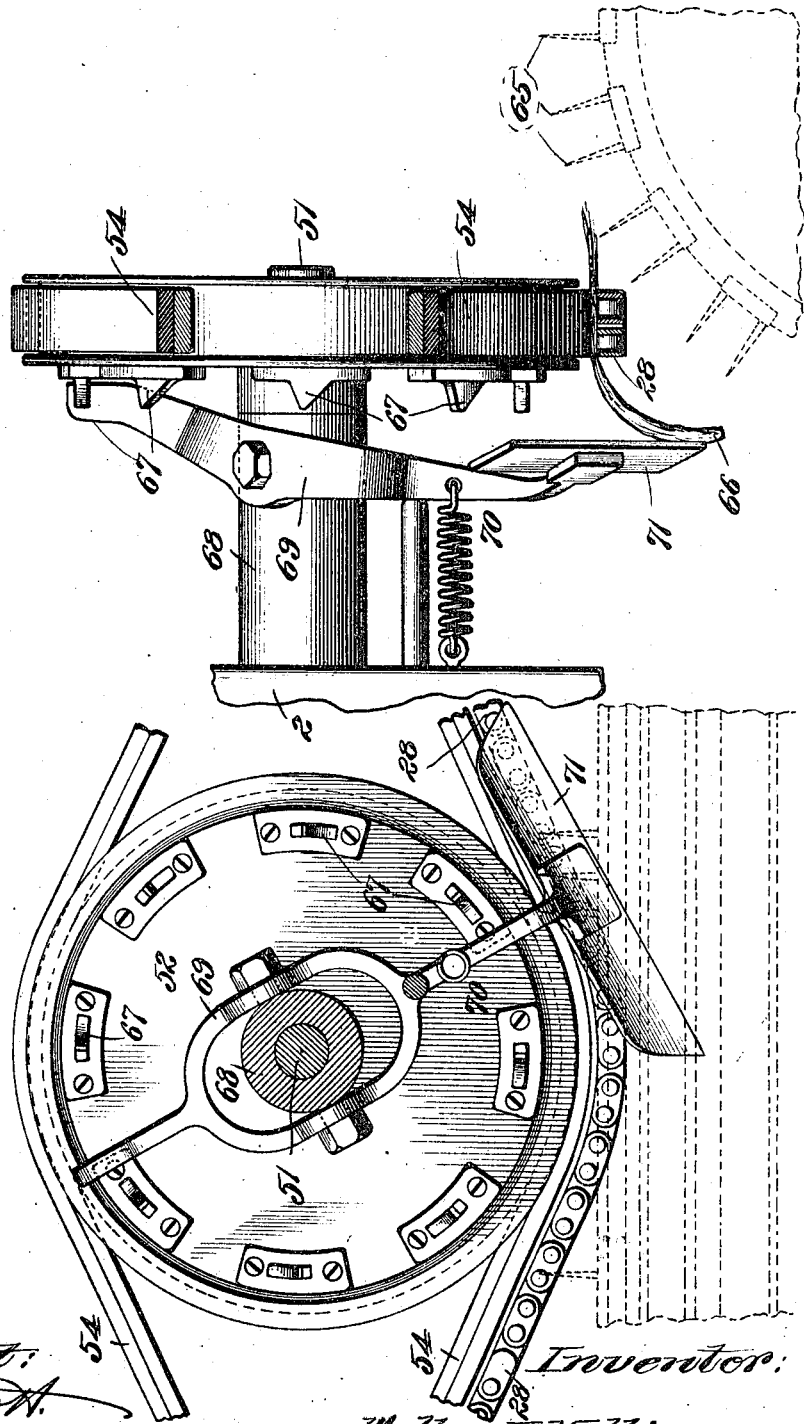

UNITED STATES PATENT OFFICE.

WALTER JOHN HOLLIER, OF ST. LOUIS, MISSOURI.

MACHINE FOR DECORTICATING FIBROUS PLANTS.

1,155,730.   Specification of Letters Patent.   Patented Oct. 5, 1915.

Application filed May 19, 1913. Serial No. 768,455.

*To all whom it may concern:*

Be it known that I, WALTER JOHN HOLLIER, a subject of the King of Great Britain, residing in the city of St. Louis and State of Missouri, have invented new and useful Improvements in Machines for Decorticating Fibrous Plants, of which the following is a specification.

This invention relates to a novel machine for separating the fiber from fibrous plants of either the leaf or stalk variety. It is particularly adapted for recovering fiber from plants of the aloe and agave families, from New Zealand and Manila hemp, and from sansivera, penguin and the banana stalk.

In the embodiment of the invention, as illustrated in the accompanying drawings, which were made from a full size, commercial machine, I aim to provide more particularly for the treatment of the leaf plants as indicated above; but the principle of the invention may be equally well applied to the treatment of all characters of fibrous plants, including, among others of the stalk variety, ramie, hemp and jute, and more particularly flax, necessitating only such changes in form or proportion as may be required by the nature or size of the material to be treated.

Generally speaking, the machine comprises two revolving cylinders mounted on the same shaft to rotate in unison, said cylinders being provided with rows of projecting pins around their circumference, and means for feeding the material lengthwise of these cylinders and into contact with the pins thereof in such manner that the outer cuticle and waste matter is removed from the fiber from first one portion of the leaf or stalk and then from the other.

A highly important feature of the invention is the fact that the plants are so fed that they are gradually acted upon by the cleaning parts of the cylinders, which operation obviates strain on the fiber and eliminates practically all loss of same. The second cylinder is employed for decorticating the portion of the plant previously gripped by and closely adjacent to the feed carrier of the first cylinder, and which, therefore, cannot be cleaned by the first cylinder.

In an application for Letters-Patent of the United States, filed by me on August 5th, 1912, Ser. No. 713,220, I describe and illustrate a decorticating machine comprising two revolving cylinders of different size, and the present invention possesses many of the features and advantages characteristic of my previous invention. The present machine, however, differs in construction and operation from my previous invention in many important particulars, and among the desirable characteristics of the present machine I may mention that the feed mechanism for both cylinders is self-adjusting, so that one or several stalks or plants may equally well be gripped and conveyed by such mechanisms; practically the entire operating mechanism is covered and thereby protected from the access thereto of pulpy and woody particles which are combed from the plants by the action of the decorticating cylinders, and which, by getting into the running gear of the machine when the same is unprotected, seriously interfere with the operation thereof, and necessitate the frequent stopping of the machine to clean it; and, finally, the arrangement of the pins on the cylinders, combined with the method of feeding insures that the plants shall be gradually, as well as progressively, acted upon so that the strain on the fiber is reduced to the minimum, and there will be practically no breakage thereof.

Figure 8:
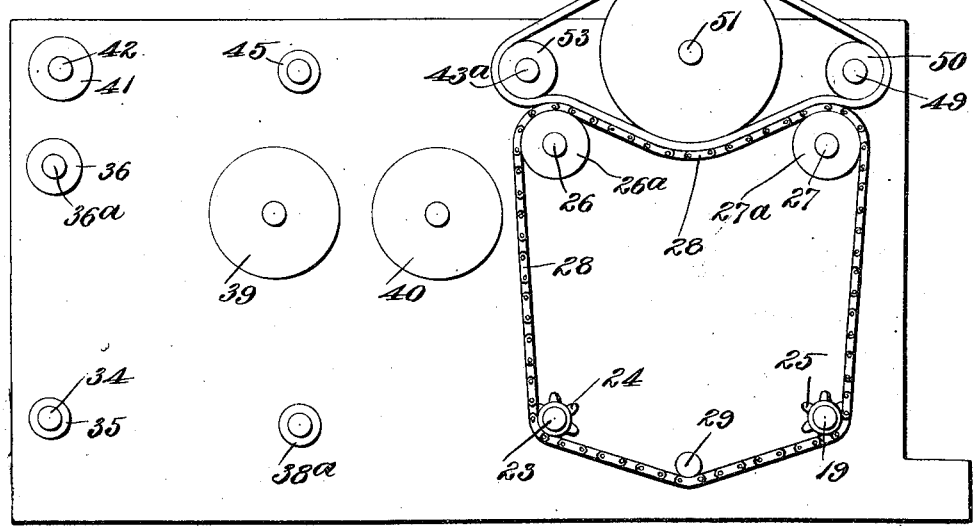
Figure 9:
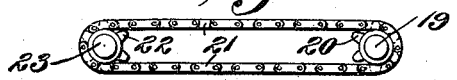

In the drawings—Figure 1 is a view in front elevation of a machine constructed according to my invention; Fig. 2 is a plan view of the same; Fig. 3 is a view in end elevation looking from the left-hand side of Fig. 1; Fig. 4 is a sectional view on the line 4—4 of Fig. 1, illustrating the construction of a compensating disk, forming an element of the feeding mechanism, and of the means for forcing the butt end of the stalks or leaves inward to enable them to be engaged by the pins of the cylinder; Fig. 5 is a view in front elevation of the compensating disk, the cap plate thereof being removed; Fig. 6 is a view similar to Fig. 1 with the decorticating cylinders shown in dotted lines, and illustrating the location and arrangement of the plates for protecting the feed mechanism and other operating parts of the machine; Figs. 7 to 9 are diagrammatic views illustrating the arrangement and location of the various members of the feeding mechanism and the drive therefor; Fig. 10 is a view in rear elevation showing a modified construction of the device for forcing the butt ends of the material into contact with the decorticating cylinder; and Fig. 11 is a view in side elevation of the same.

Referring now to these drawings, the numeral 1 indicates the base of the machine, and 2 an upright frame located at the rear of the base 1 and on which most of the operating parts of the machine, especially of the feeding mechanism, are mounted. Extending upwardly from the base 1 at each end thereof are standards 3, supported in bearings 4 on which is the main drive shaft 5 having a driving pulley 6 mounted on one end thereof. On the opposite end of the shaft is a worm 7 which meshes with a worm wheel 8 mounted on the end of a shaft 9 which is mounted in bearings 10 and has at its opposite end a gear 11. Mounted in endwise relation on the shaft 5, and separated by a slight distance from each other, are two decorticating cylinders 12, 13. Each of these cylinders comprises two heads 14, 15, which are connected by bars 16, each of said bars having two rows of pins 17 secured therein. The pins 17 of the cylinder 12 are obliquely disposed to the radii and to this end the heads 14, 15, are provided with tangential recesses to receive the ends of the bars 16, so that the rear side of the bar, relative to the direction of the rotation of the cylinder, is elevated, thereby causing the pins 17 to project forwardly. The object of this construction is to enable the pins 17 to more readily pierce the material being treated. In explanation I will state that in practice I have found that where the pins project radially they tend at first to merely scrape the surface of the plant, so that the latter will travel some distance over the cylinder before being effectively acted upon by the pins. By arranging these pins tangentially as described, so that they will have a forward projection, their angle of inclination is such that in the rotation of the cylinder they tend to at once pierce the plant or other material resting upon and being passed over the cylinder for the purpose of being decorticated. This construction is not so essential for the finishing cylinder 13, as the exigencies of operation insure that the butt ends of the leaves or stalks will be effectively acted upon by the pins of the cylinder. I may, however, employ the forward inclination of the pins on this cylinder likewise. The provision of the separated inclined bars on the decorticating cylinders subserves an important purpose in the operation of the machine, in addition to the inclination they impart to the pins thereon. That is to say, the elevated side of every bar presents a sharp scraping surface, which acts in an efficient manner to knock off thorns, or other projections, on the material being cleaned, and to brush the woody or pulpy particles, and the like, from the fiber, thus materially assisting in the cleaning operation.

The pins on the bars of each cylinder are preferably so arranged that every alternative bar 16 will contain toward its forward end two or more relatively widely separated pins $17^a$ while the remainder of the pins on the bar, till near the opposite end thereof, are substantially located the same distance apart where one or more of the pins $17^b$ may be separated a greater distance from the others.

One of the important features of the present invention is the construction, arrangement and operation of the endless complemental traveling feed members, and these, with the manner of operating the same, I will now describe. The gear 11 before referred to, and which is driven from the main shaft 5, is in mesh with a larger gear 18, mounted on a shaft 19, suitably supported in bearings on the base 1. On the shaft 19 is a sprocket wheel 20 over which runs a sprocket chain 21 (see Figs. 1, 3 and 9) which likewise passes around a sprocket wheel 22 mounted on a shaft 23 which is parallel with the shaft 19, and supported in a similar manner. Mounted on the shaft 23 is a double sprocket wheel 24 (see Fig. 8) and on the shaft 19 is a similar double sprocket wheel 25. Above and in vertical alinement with the shafts 19 and 23 are stub shafts 26 and 27 on which are mounted sheaves $26^a$, $27^a$, and around the sprocket wheels 24 and 25 and the sheaves $26^a$ and $27^a$ extends an endless double sprocket chain 28 which is held to proper tension by means of a roller 29 bearing on the chain and mounted on the end of a tension arm 30 which is controlled by a lever 31, the upper end of which is normally drawn outward by a spring 32, in the usual manner. Mounted on the shaft 23 is a double sprocket wheel 33, and at the end of the machine, the left end, as shown in Fig. 1, is mounted on a shaft 34 a sheave 35.

Located above and substantially in vertical alinement with the sprocket wheel 33 and sheave 35 are sheaves 36 and 37, the sheave 36 being located on a shaft $36^a$ and the sheave 37 on the shaft 26, and around said sheaves and sprocket wheel is passed a double sprocket chain 38, said chain passing over a grooved idler 39 and under a similar grooved idler 40 from which, however, it is separated by another feed chain to be described. A tension roller $38^a$ on an arm $38^b$ controlled by a lever $38^c$ through the medium of a spring $38^d$ maintains the proper tension of the chain 38. Above the sheave 36 is mounted a sheave 41 on a shaft 42 (see Figs. 1 and 7), and above the sheave $26^a$ is mounted a sheave 43 on a shaft $43^a$. Around the sheaves 41 and 43 passes a double sprocket chain 44 which also passes over the guide pulley 39 on top of the chain 38, and under the guide pulley 40 between said guide pulley and the chain 38, and partly over the sheave 26ª. The chain 44 is separated from the latter sheave, however, by the said chain 28 which runs on said sheave. The chain 44 is rotated by frictional contact with the chain 38, and is maintained at the proper tension by means of a roller 45 bearing thereon and mounted on the end of a tension device 46, having an arm 47 normally pulled inward by a spring 48. The shaft 43ª is located beyond or to the left of the vertical center of the shaft 26. Located in a similar manner beyond or to the right of the vertical center of the shaft 27, and in horizontal alinement with the shaft 43ª, is a shaft 49 on which is mounted a sheave 50. Between the shafts 43ª and 49 is mounted a stub shaft 51 on which is rotatably mounted a yielding or compensating friction feed disk 52, the construction of which will be described later. Mounted on the shaft 43ª is a sheave 53, and around the sheaves 53 and 50, and passing over and under the feed disk 52 is a flexible feed belt 54, which is preferably constructed of leather with an outer facing of rubber. The sheaves 53 and 50 are so positioned relative to the sheaves 26ª and 27ª, and the diameter of the compensating feed disk 52 is such that the feed belt 54 will travel in contact with the feed chain 28 from a point immediately under the sheave 53 to a point immediately under the sheave 50, the greater diameter of the feed disk 52 causing the belt 54 and chain 28 to be depressed in the space between the sheaves 26ª and 27ª, the purpose of this being to carry the material being decorticated in a downward direction so that its butt end may be brought into contact with the pins of the finishing cylinder 13.

It will be observed that the bottom of the sheave 41 is located some distance above the top of the sheave 36, thereby providing a space 55 between the two opposing feed chains 38 and 44, which constitute a feed opening for permitting the insertion of the material to be decorticated between the two chains. This space gradually narrows, however, owing to the fact that the chain 44 travels at an incline to the chain 38 until, at a point in line with the vertical axis of the guide pulley 39, the opening disappears and the two chains 38 and 44 travel in contact with each other. Thus the material inserted in the space 55 is gradually gripped by the chains 38 and 44 and carried by them over and past the decorticating cylinder 12, whence it is carried upward and passed between the feed chain 28 and the feed belt 54 by which means it is carried over and past the finishing cylinder 13. As shown by Fig. 3, the feed belt 54 and endless feed chain 28 are located in a plane in advance of the plane in which the feed chains 38 and 44 are located. Thus when the material passes off of the cylinder 12 its decorticated portion is gripped between the feed chain 28 and the belt 54 at the same time that the untreated butt end passes from between the feed chains 38 and 44. It is now necessary that the butt end be turned to a position to enable it to be treated by the pins of the finishing cylinder 13. For accomplishing this operation the preferred construction, as illustrated in Figs. 3 and 4, comprises a disk 56 which is loosely mounted on a series of pins 57 projecting from the rear side of the feed disk 52. Coil springs 58 are interposed between the said disk 52 and the disk 56 which tend normally to press the disk 56 away from the feed disk 52, and the disk 56 is held on the pins by means of nuts 59.

The numeral 60 indicates a bolt which has screw-threaded engagement in a bearing 61 provided in the upright frame member 2, and is adapted to be held in adjusted positions therein by a nut 62. The inner end of the bolt 60 is provided with a head 63 in which is mounted a roller 64 which bears on the outer side of the disk 56 near the bottom thereof, so that as said disk is rotated by the feed disk 52 its lower side will be forced inward or toward the pins 65 of the cylinder 13. Thus as the butt end 66 of the material passes from between the feed chains 44 and 38 it will be engaged by the disk 56, as clearly shown in Fig. 4, and gradually bent downward and inward so that it will be engaged by the pins 65 and be decorticated. The feed chain 28 and belt 54 engaging the portion of the plant that has already been decorticated by the pins of the cylinder 12 carry the material over the cylinder 13 and finally discharge it at the right of the machine, as shown in Fig. 1.

In Figs. 10 and 11 I have shown a modified construction of apparatus for effecting the turning in of the butt end of the plant. According to this construction the rear side of the feed disk 52 is provided with a circular series of cam teeth 67. A sleeve 68 surrounds the shaft 51 and pivotally mounted on this sleeve is a lever 69 having toward its lower end a spring arm 70 which bears against the rear face of the disk 52 and normally presses the upper end of the lever into contact with the cam teeth 67. On the lower end of the lever 69 is mounted a plate 71 which operates in the same manner as the disk 56 to engage the butt ends of the plants and force them inward toward the pins of the cylinder 13. As the cam teeth 67 engage the upper end of the lever 69 the plate 71 is forced inward toward the cylinder 13, and as the end of the lever 69 passes off of each cam tooth the spring 70 forces the plate 71 outward or away from the cylinder 13. A movable member, such as the disk 56 or the plate 71, is found necessary for guiding the butt end of the plants into contact with the pins of the cylinder 13, as it has been found in practice that the plant or material to be decorticated tends to cling or stick to a stationary guide and to be retarded in its movement, thereby so distorting the position of the material relative to the cylinder that it will not be properly engaged by the pins of the cylinder 13, and as a result the butt end of the plant will be imperfectly decorticated.

The location of the feed chain 44 relative to the feed chain 38 to provide the feed opening 55 is an important feature of the invention, as it permits me to utilize a relatively wide opening to accommodate different sizes of plants, and a greater or less thickness of material, where a number of superposed stalks or plants are inserted at the same time.

When the decorticated portion of the plant passes between the feed chain 28 and the feed belt 54, it is necessary to provide means, such as the disk 52, for maintaining the rubber faced belt 54 in firm contact with the material, as these two feed members have to grip the finely shredded portion of the material, whereas the grip of the chains 44 and 38 is on the portion of the plant that has not been decorticated. It is further necessary that the device used to force the feed belt 54 into firm contact with the feed chain 28 should be yielding, as otherwise when a large body of material reached such device, it would not pass under it and would chock the machine. In the case of the disk 52, the latter would simply revolve without turning the feed belt 54, or, more properly, the chain 28 would move without rotating the belt 54, as the belt 54 and the feed disk 52 are rotated by frictional contact of the belt 54 with said feed chain and the disk 52. To provide for such yielding of the feed disk I employ the construction illustrated in Figs. 4 and 5, which will now be described.

The numerals 72 indicate leaf springs which are secured centrally by means of screws 73 to the periphery of the disk 52, four of such springs being shown. Surrounding the disk 52 is a ring 74 which is provided with an annular flange 75 against which the opposite ends of the leaf springs bear. The disk 52 is provided with a radial flange 76 against which a radial flange 77 on the ring 74 bears, and the said ring is held in contact with the radial flange of the disk 52 by means of a face plate 78 which is secured to the face of the disk 52 by means of screws 79. The springs 72 engage the ring 74 with sufficient force to cause the ring to rotate with the disk 52. Should, however, material of unusual thickness pass between the chain 28 and belt 54 at the point beneath the feed disk, the springs 72 will permit the said ring to yield and assume the position shown in Fig. 5, thereby accommodating the material and permitting it to pass through. It will be understood that the flanges 76 and 77, and the flange 75 and face plate 78 have a sliding contact so that the ring 74 may have a radial movement relative to the disk 52 while being maintained in position thereon.

In order to facilitate the passage of the decorticated material as it leaves the feed chains 38 and 44 between the feed chain 28 and feed belt 54, I provide on the outer face of the sheave 53 a disk 80 having a serrated periphery, as indicated at 81, so that in the rotation of the sheave 53 the teeth 81 will engage the shredded portion of the plant and force it into the space between the feed chain 28 and feed belt 54.

As heretofore mentioned, a characteristic feature of the present invention is the fact that the operating parts of the machine, including the feeding mechanism, are protected from access thereto of particles of wood and pulp. The two feed mechanisms, with their driving and supporting parts, are located, respectively, in parallel planes. To protect these parts I secure on suitable supports, mounted on the upright frame 2, upper plates 82 and 83, and a lower plate 84, which are placed in front of the mechanisms referred to, and are separated, as to the plates 82 and 84, along the line of the path of the feed chains so as to present a narrow slit or opening 85 which permits the passage through the machine of the material to be treated. There is also a plate 86 beneath the plate 83, which conforms in contour to the cylinder 13 and protects the parts immediately behind it. The plate 84 extends the entire length of the machine, and is provided with a circular opening 87 which permits room for the turning of the butt end of the plant for its decortication by the second cylinder. The plate 82 has a rearwardly extending portion 88 which extends over the feed chains and the operating parts beneath, and the plate 83 is provided with a rearwardly and downwardly extending portion 89 which forms a housing to cover the operating parts at the rear end of the machine. An opening 90 is provided in the plate 84 for the passage therethrough of the belt which will run on the pulley 6.

I have also heretofore referred to the feed mechanisms as being self-adjusting, and have particularly described the manner of accomplishing this result in connection with the feed mechanism of the second decorticating cylinder wherein a compensating disk is employed. The same result is secured in the case of the feed chains 38 and 44 by reason of the fact that one or the other of these chains is always free to yield, neither of the feed chains having on its outer side a fixed or movable guide, such as is customarily employed. This will be apparent from an inspection of the drawings where it will be seen that as both chains pass over the guide pulleys 39 and 40 in superposed relation, one or the other of these chains is always on the outside, and free to yield to accommodate greater thicknesses of material inserted between them.

A feed table 91, extending in line with, but slightly below, the chain 38 and having a rearwardly extending portion 92 provided with a vertically-disposed flange 93, is mounted on the frame of the machine for receiving the material to be fed between the chains 38 and 44.

I claim:

1. A machine for decorticating fibrous plants comprising a pair of rotatable decorticating members, feeding means for conveying material over the first of said members, feeding mechanism traveling in a curved path for conveying the material over the second of said members comprising an endless chain and an endless belt traveling in contact therewith, and means normally exerting a yielding pressure on said belt for forcing it into firm contact with said chain.

2. A machine for decorticating fibrous plants comprising a pair of rotatable decorticating members, means for conveying the material over the first of said members, means for conveying the material over the second of said members comprising an endless chain and an endless belt traveling in contact therewith, and a compensating disk around which the said belt and chain are passed whereby to hold the belt in yielding contact with the chain.

3. A machine for decorticating fibrous plants comprising a pair of rotatable decorticating members arranged in endwise relation, feed mechanism for each of said conveyers, the feed mechanism of the first member being located in a plane in advance of the feed mechanism of the second member, and said feed mechanisms being so arranged that the first will deliver its material to the second, and movable means coöperating with the second feed mechanism for turning the portion of the plant engaged by the first feed mechanism into contact with the second decorticating member.

4. A machine for decorticating fibrous plants comprising a pair of rotatable decorticating cylinders arranged in endwise relation, feed mechanism for each of said cylinders, the first of which is adapted to deliver the material to the second, a member mounted adjacent to the second decorticating cylinder and adapted to be engaged by the plant as it passes into its feed mechanism, and means operated by the machine for moving said member inward to cause it to turn the butt end of the plant into contact with the second decorticating cylinder.

5. A machine for decorticating fibrous plants comprising a pair of rotatable decorticating cylinders arranged in endwise relation, feeding mechanism for each of said cylinders, the one being adapted to deliver material to the other, and means for turning the end of the plant engaged by the first feed mechanism into contact with the second decorticating cylinder, comprising a rotatable member located adjacent to said second decorticating cylinder, a disk carried thereby and located in the path of the plant, springs tending normally to force said disk away from its rotating member, and a fixed contact member engaging said disk near the outer edge thereof and operating to press the edge portion of said disk inward or toward its rotating member in the rotation thereof, whereby to turn the butt end of the plant downward into engagement with the said second decorticating cylinder.

6. In a machine of the class described, in combination with an endless feed chain and an endless belt arranged to travel in contact therewith, means for forcing said belt yieldingly into contact with said chain comprising a rotatable disk having springs secured on its periphery, a ring encircling said disk and frictionally engaged and supported on its inner side by said springs, and means for housing the said ring on said disk, the said belt passing over and under the said ring.

7. In a machine of the class described, in combination with the decorticating members, complemental endless conveyers between which the material is adapted to be gripped and fed through the machine, and upper and lower sets of cover-plates interposed between the conveyers and the decorticating members and having their meeting edges separated along the line of feed.

In testimony whereof, I have hereunto set my hand in presence of two subscribing witnesses.

WALTER JOHN HOLLIER.

Witnesses:
JULIA M. LAURENT,
STELLA HILL.